F. D. STOWE.
TURRET PRESS.
APPLICATION FILED APR. 24, 1914.

1,261,868.

Patented Apr. 9, 1918.
10 SHEETS—SHEET 1.

Witnesses.
M. Morse
J. Freudenwall

Inventor
Floyd D. Stowe
By his Attorneys
Brindle & Wright

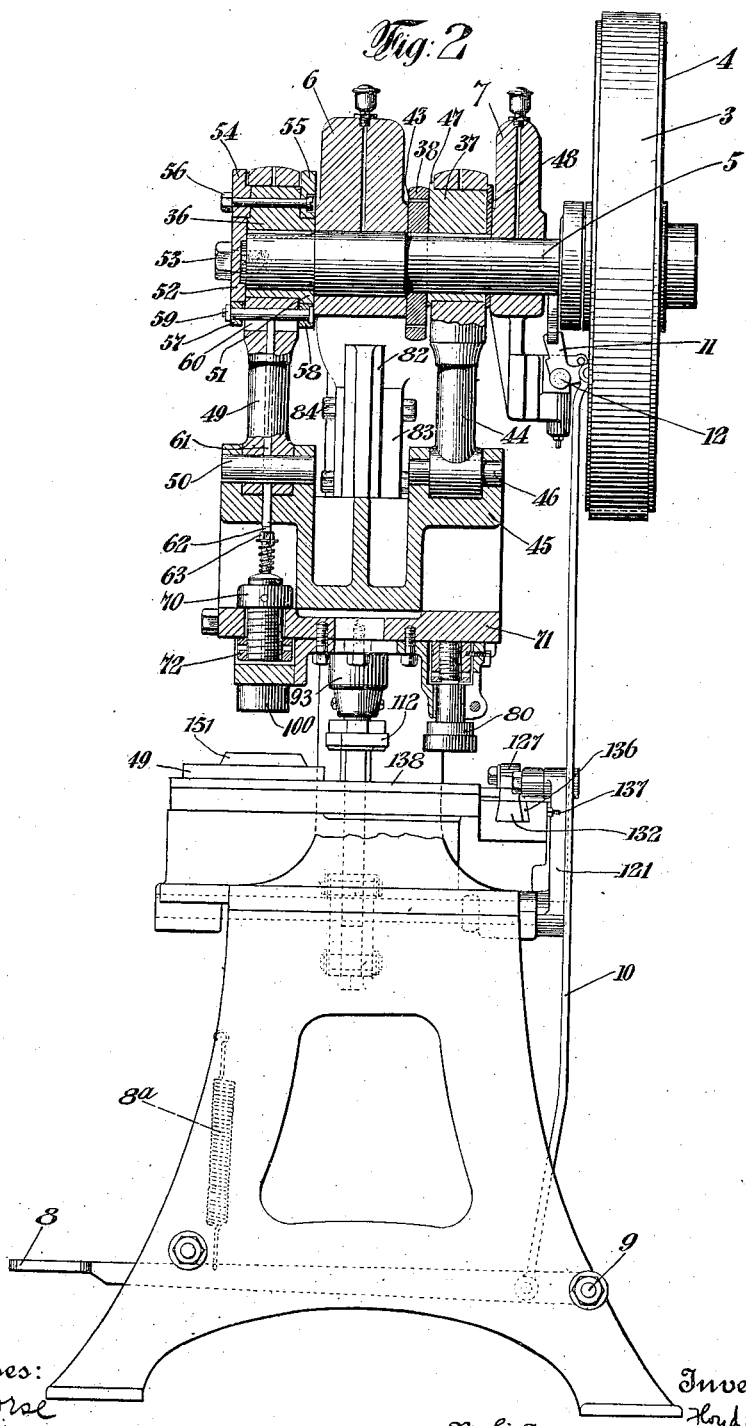

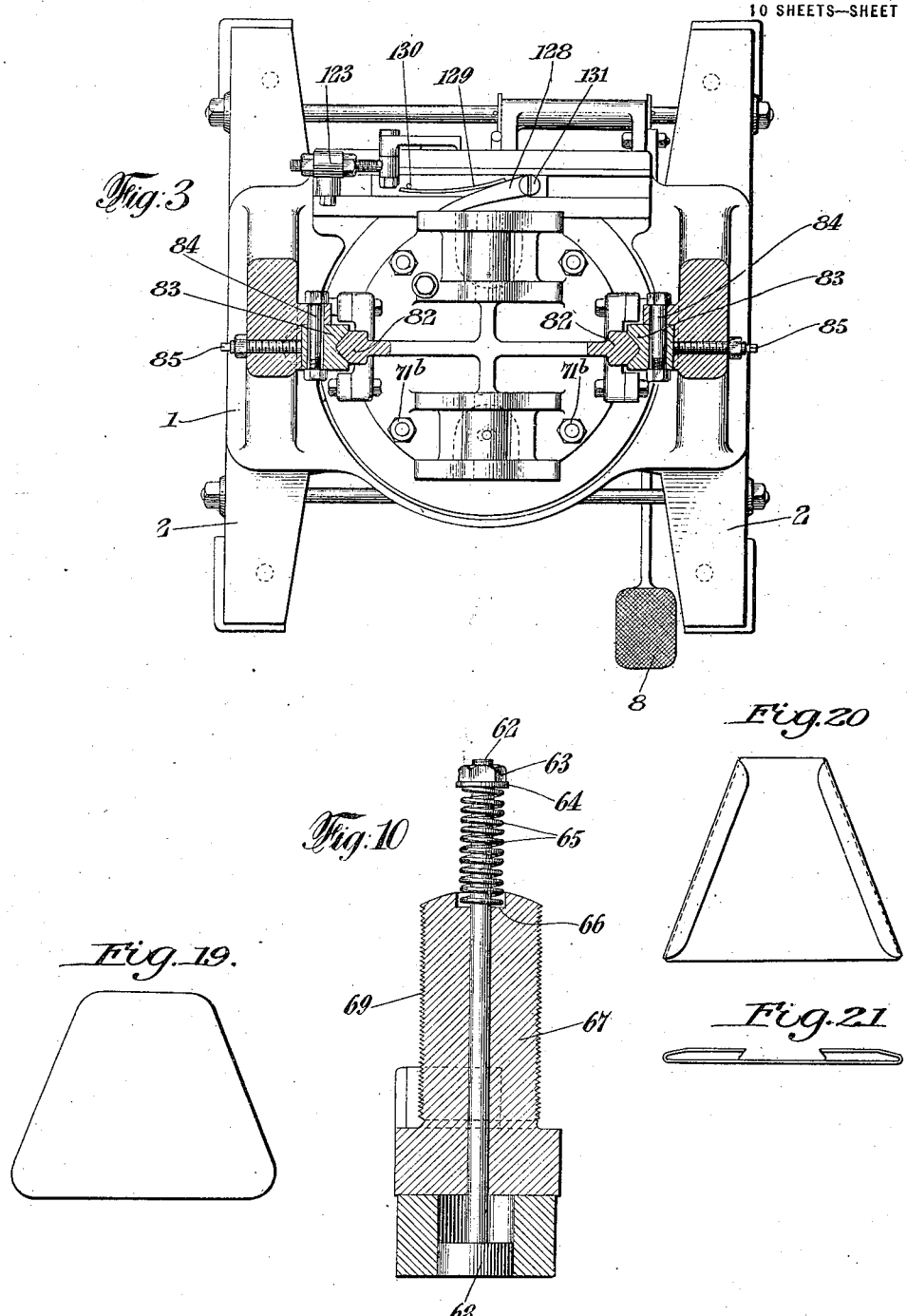

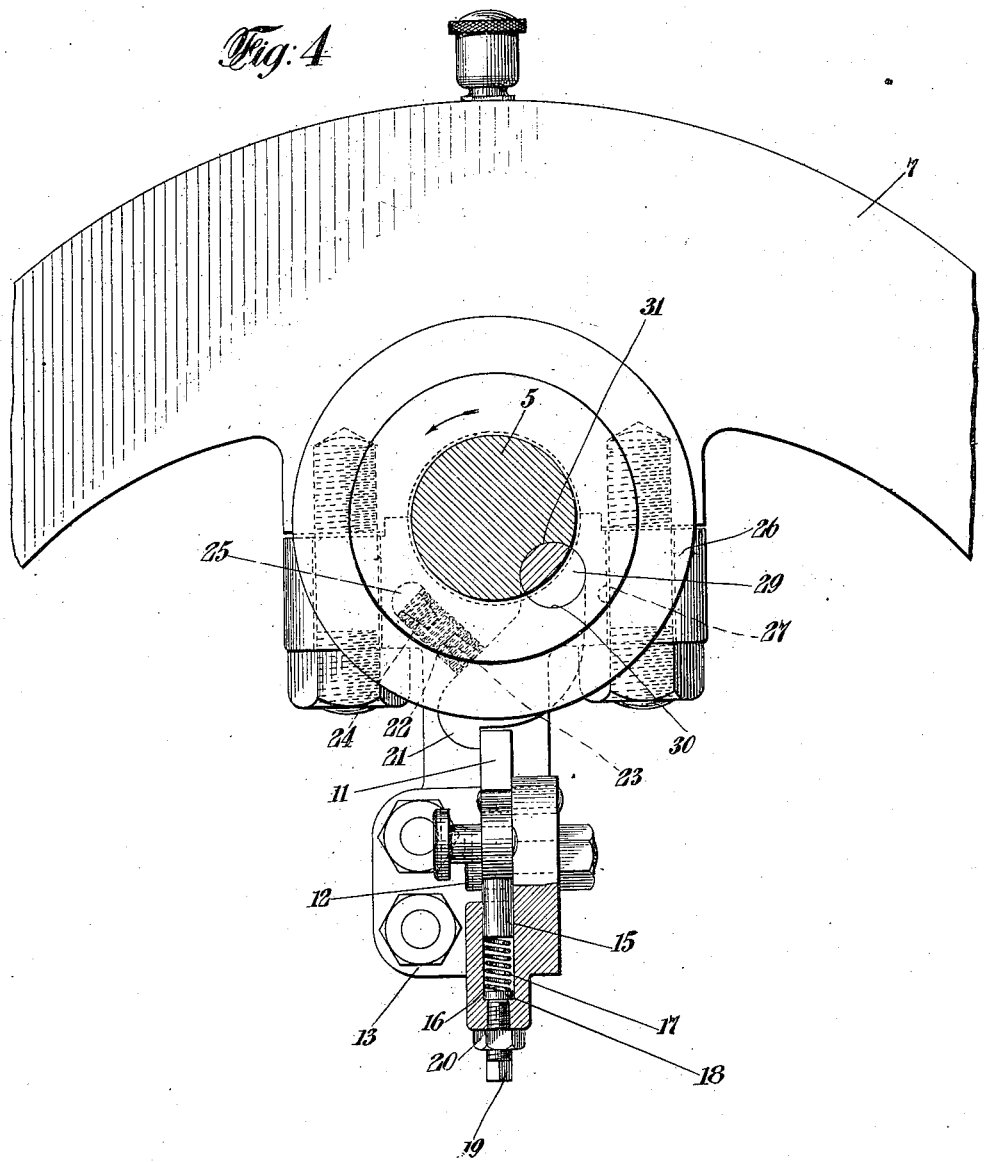

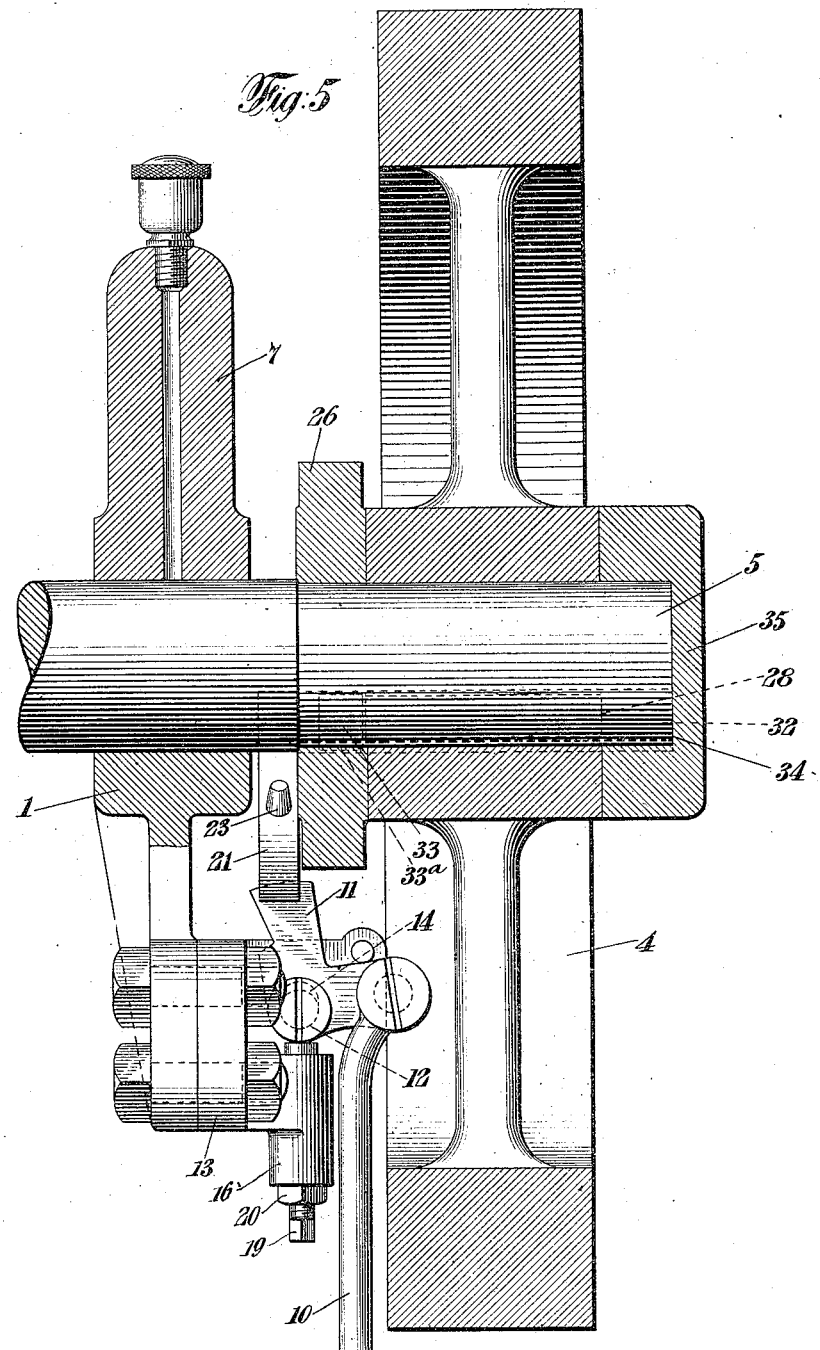

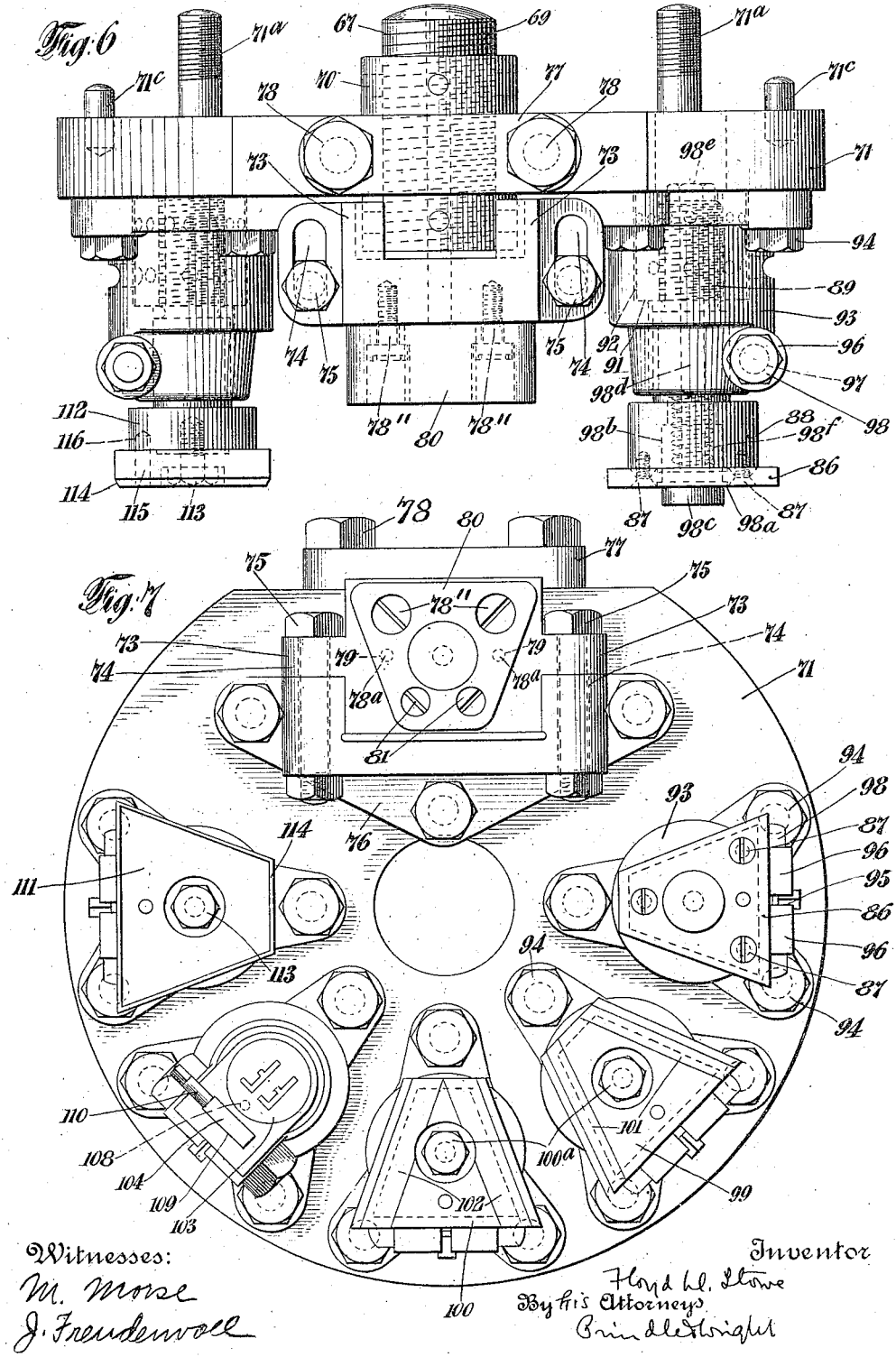

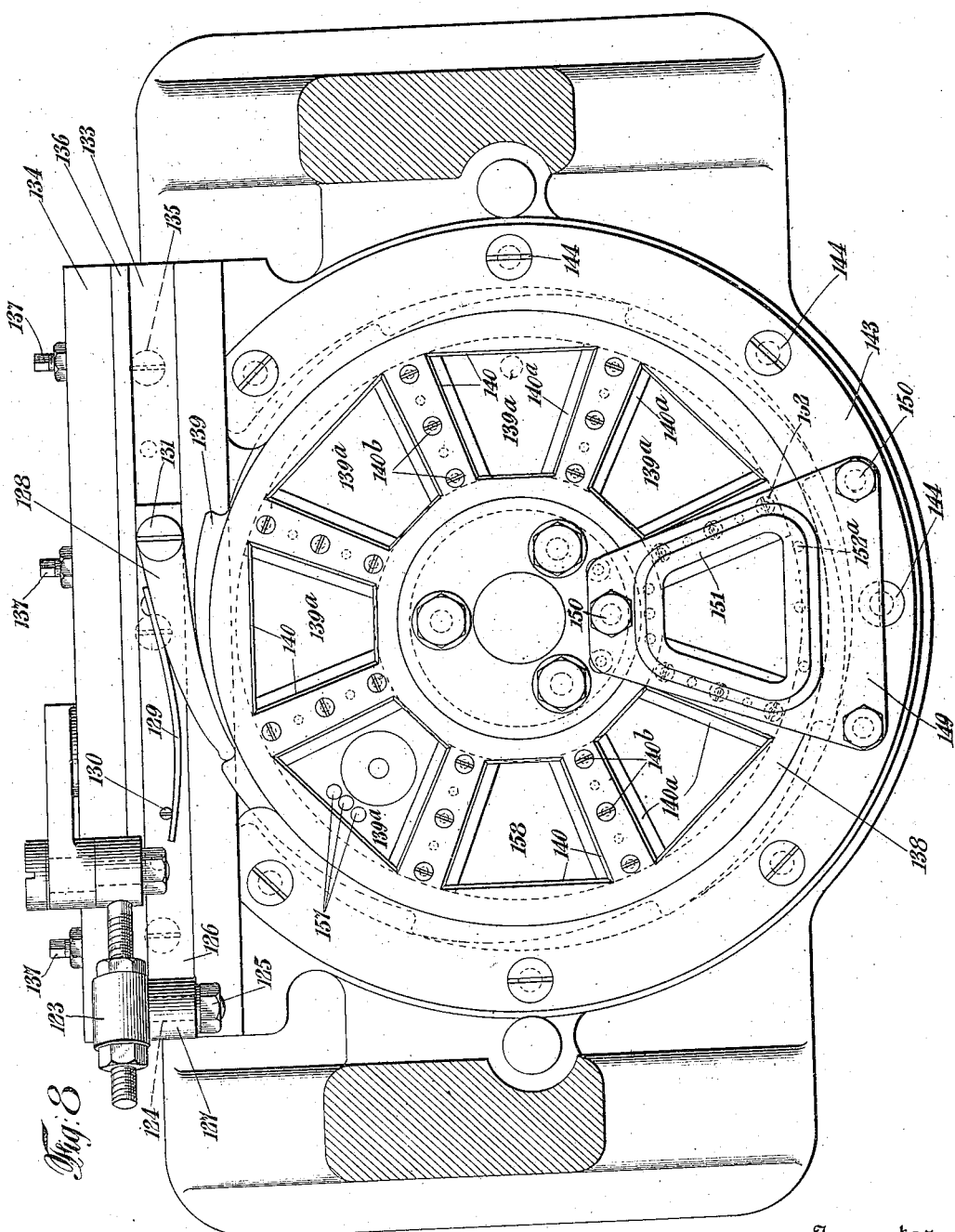

F. D. STOWE.
TURRET PRESS.
APPLICATION FILED APR. 24, 1914.
1,261,868.
Patented Apr. 9, 1918.
10 SHEETS—SHEET 9.
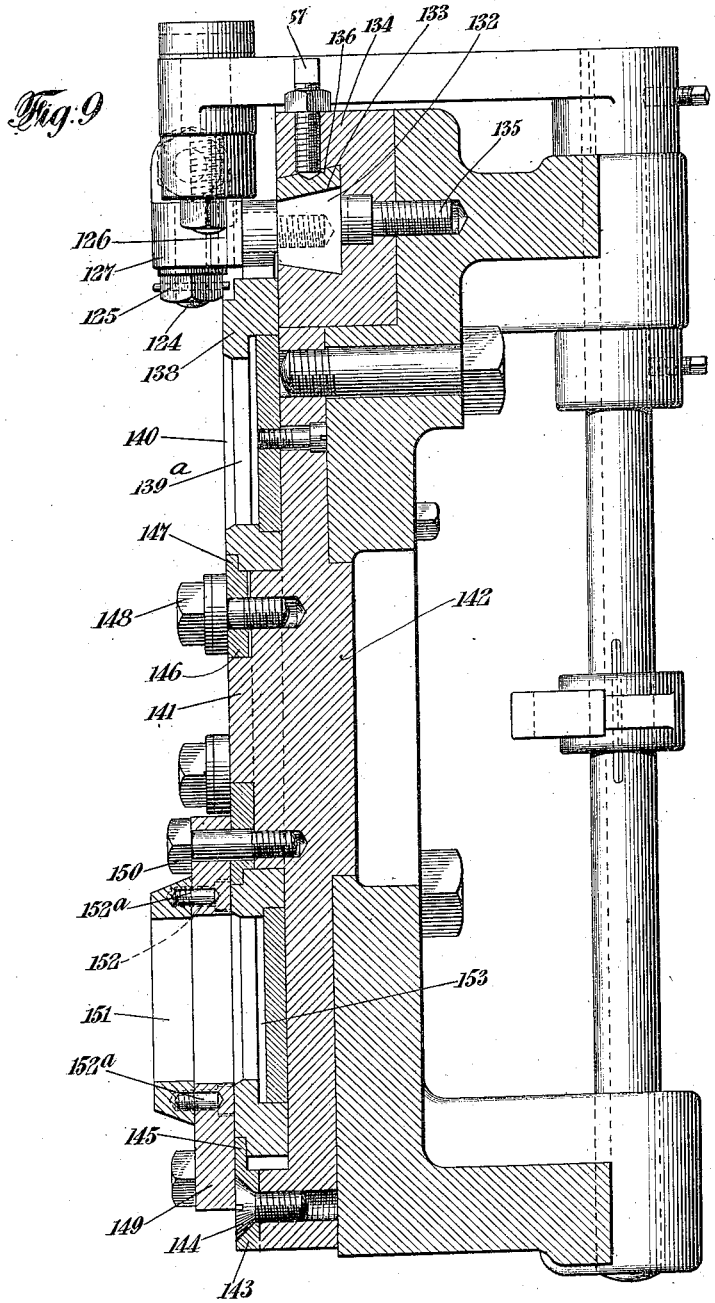
Witnesses:
M. More
J. Freudenvogel
Inventor
Floyd D. Stowe
By his Attorneys F. D. STOWE.
TURRET PRESS.
APPLICATION FILED APR. 24, 1914.
1,261,868.
Patented Apr. 9, 1918.
10 SHEETS—SHEET 9.
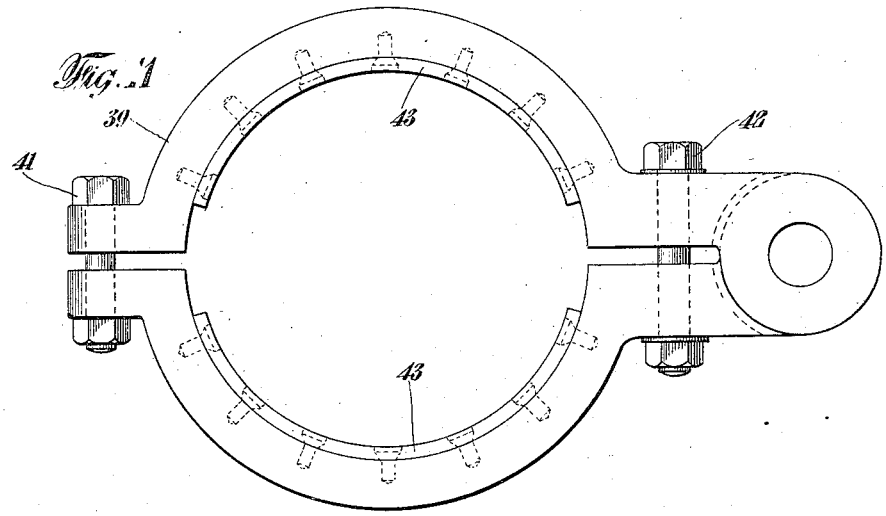
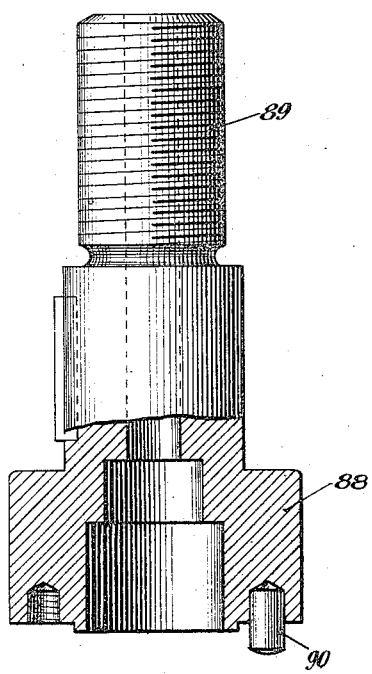
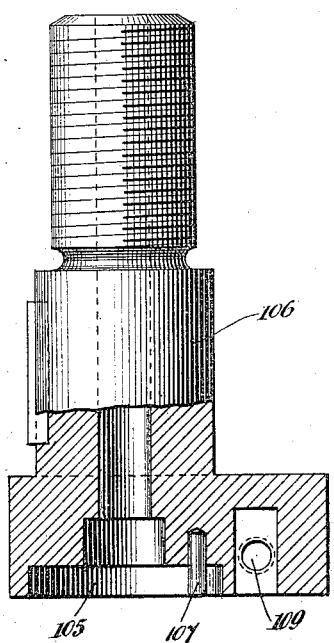

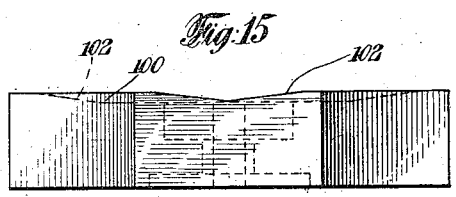
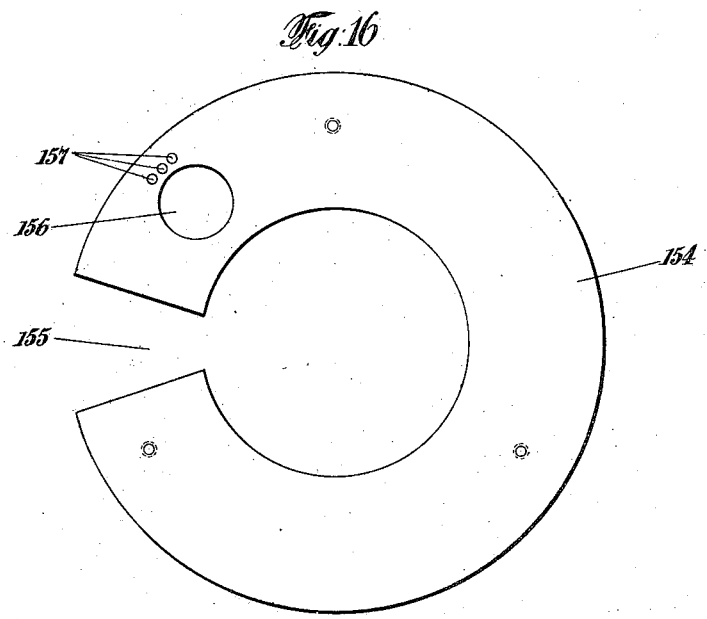
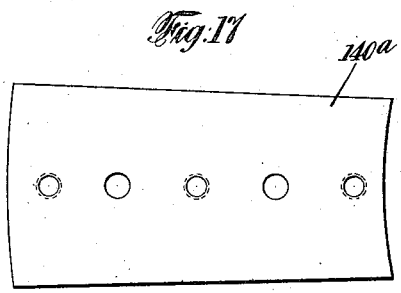
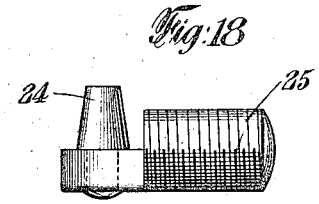

UNITED STATES PATENT OFFICE.

FLOYD D. STOWE, OF WILMINGTON, DELAWARE, ASSIGNOR TO E. I. du PONT de NEMOURS POWDER COMPANY, OF WILMINGTON, DELAWARE, A CORPORATION OF NEW JERSEY.

TURRET-PRESS.

1,261,868.   Specification of Letters Patent.   Patented Apr. 9, 1918.

Application filed April 24, 1914. Serial No. 834,081.

*To all whom it may concern:*

Be it known that I, FLOYD D. STOWE, of Wilmington, in the county of New Castle, and in the State of Delaware, have invented a certain new and useful Improvement in Turret-Presses, and do hereby declare that the following is a full, clear, and exact description thereof.

My invention relates particularly to presses designed for carrying out a series of operations, but it has especial reference to carrying out a series of operations in connection with the formation of slides or ears for closing bung-holes in powder kegs. While I shall describe my invention as applied particularly to forming slides for use in connection with powder kegs, my invention is described in this manner merely for the purpose of illustration inasmuch as it has application to carrying out any series of operations upon blanks of any kind.

The object of my invention is to provide a press of the above character which will punch out a blank and put the blank through a series of forming operations until the blank is in its final shape without the necessity of utilizing any manual operations during the formation of the blank.

By means of my invention a blank may be punched out, automatically delivered to a rotary carrier in which the blank is subjected successively to the desired series of operations, and thereafter automatically discharged from the carrier in its completely formed shape.

While my invention is capable of embodiment in many different forms, for the purpose of illustration I have shown only one form thereof in the accompanying drawings, in which—

Fig. 2 is a vertical section of the same;

Fig. 3 is a horizontal section of the same;

Fig. 4 is a vertical section of an enlarged detail thereof showing the clutch arrangement.

Fig. 5 is a vertical section of an enlarged detail thereof also showing the clutch arrangement;

Fig. 6 is a side elevation of the punch plate and attached parts;

Fig. 7 is a bottom view of the same;

Fig. 8 is a plan view of the annular carrier and the means for operating the same;

Fig. 9 is a vertical section of the parts shown in Fig. 8;

Fig. 10 is a vertical section of one of the punch adjusters and attached parts;

Fig. 11 is a side elevation of the bracket;

Fig. 12 is a vertical section of one of the punch adjusters;

Fig. 13 is a similar view of another punch adjuster;

Fig. 14 is a side elevation of the second folding punch;

Fig. 15 is a side elevation of the third folding punch;

Fig. 16 is a plan view of the bearing plate;

Fig. 17 is a plan view of one of the guide plates;

Fig. 18 is a side elevation of one of the spring supporting screws.

Fig. 19 is a plan view of the unformed blank; Fig. 20 is a similar view of the formed blank, and Fig. 21 is an elevation of the article shown in Fig. 20.

Figure 1:
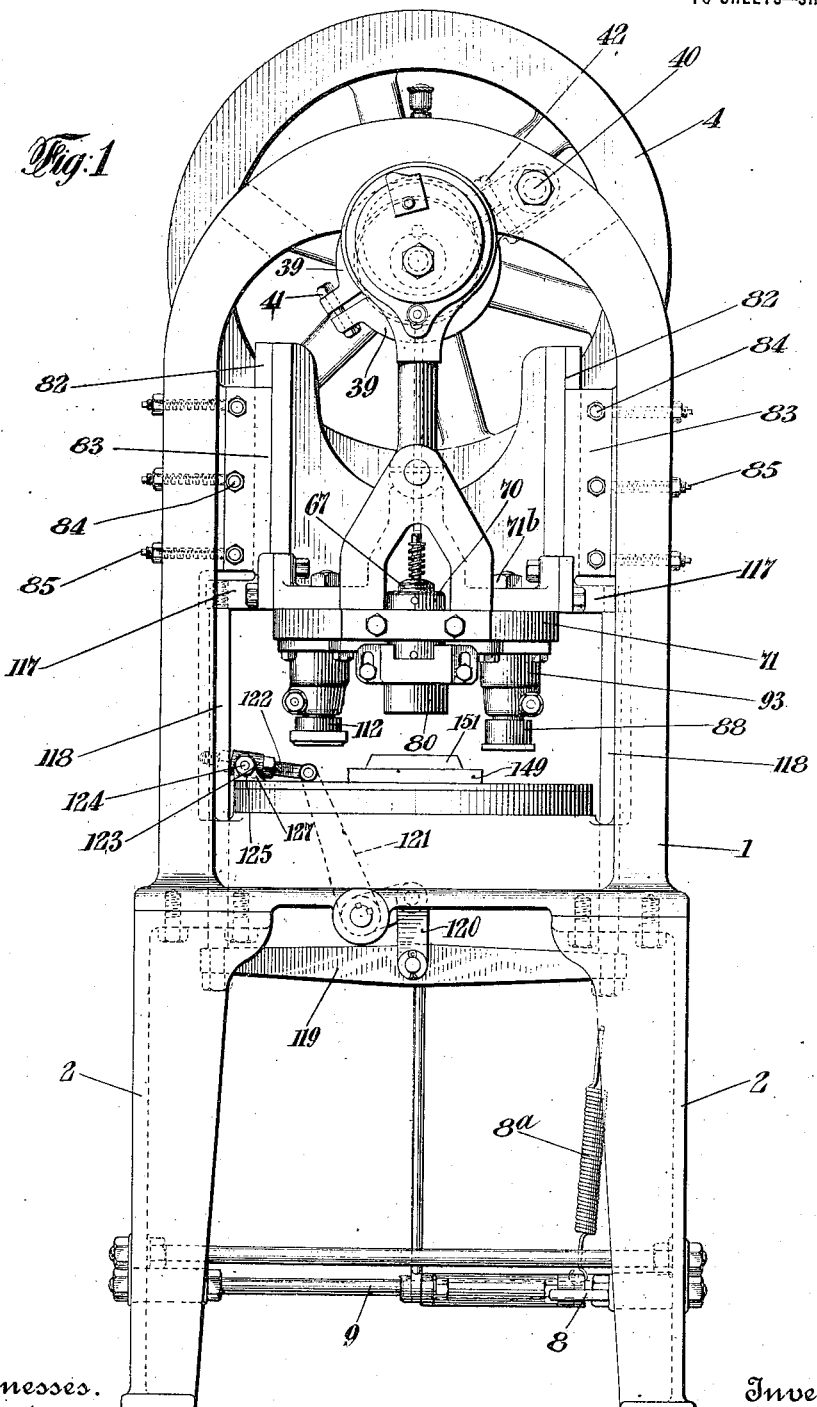
Figure 1 is a front elevation of a press made in accordance with my invention.

In the drawings I have shown a main frame 1, which is supported upon two lateral frames 2 which are attached to the bottom of the main frame 1 and which rest upon the floor. Power is supplied to the press by means of a belt 3 passing over a combined pulley and fly-wheel 4. This fly-wheel 4 is loosely carried upon a shaft 5 which is supported in bearings 6 and 7 in the main frame 1. Means is provided for connecting the pulley 4 to the shaft 5 when desired. This is accomplished by means of a treadle 8 carried upon pivots 9 in the lateral frames 2 and normally moved upwardly by a spring $8^a$ attached to one of the lateral supports 2. The treadle 8 is attached by means of a link 10 to a bell-crank lever 11. The bell-crank lever 11 is journaled upon a screw-threaded pin 12 carried by a bracket 13 attached to the main frame 1. As shown in Fig. 5 the bell-crank lever 11 has an elongated opening 14 to receive the pin 12 so as to permit a certain degree of vertical movement in the operation of the bell-crank lever 11. The bell-crank lever 11 is normally held upwardly with the lower end of the opening 14 against the pin 12 by means of a plunger 15 adapted to be pressed upwardly in a socket 16 in the bracket 13 by means of a spring 17. The spring 17 rests upon a washer 18, the position of which is adapted to be adjusted by means of a screw 19 upon which there is a lock-nut 20. Normally one end of the bell-crank lever 11 is in engagement with an arm 21 so as to disengage the pulley 4 from the shaft 5. When, however, the treadle 8 is moved downwardly the upper end of the bell-crank lever 11 is moved out of the path of the arm 21 so that the pulley 4 then becomes engaged with the shaft 5 so as to rotate the shaft with the pulley 4. When the bell-crank lever 11 is moved out of the path of the arm 21, said arm 21 is rotated by a spring 22, one end of which extends over a pin 23 located on the arm 21 and the other end of which rests against a pin 24 carried by a screw 25 which is screw-threaded into a sleeve 26 attached in any suitable manner to the inner face of the pulley 4. The movement of the arm 21 in this manner will move the arm 21 against a stop pin 27 in the face of the sleeve 26. The arm 21 is rotatably mounted upon a clutch key 28 having its central portion cut away so as to form a fragment of a cylinder 29 which fits within a recess 30 in the pulley 4, when the sleeve 26 and the shaft 5 are not in engagement, that is to say, when the bell-crank lever 11 engages with the arm 21. When, however, the arm 21 has been moved as previously described against the stop pin 27, the part 29 is rotated so as to engage a recess 31 in the face of the shaft 5 so as to rotate the shaft with the pulley 4. The clutch key 28 has at its two ends cylindrical bearings 32 and 33, the latter of which is supported within a recess 33ª in the sleeve 26 and the former of which is supported within a recess 34 in a cap 35 which is attached to the outside of the pulley 4 and which covers the end of the shaft 5.

Upon the shaft 5 there is keyed a forward eccentric 36 and a rear eccentric 37. The forward eccentric 36 is located in front of the bearings 6 and the rearward eccentric 37 is located between the two bearings 6 and 7. Between the rearward eccentric 37 and the bearings 6 there is a brake 38 comprising two semi-circular clamping arms 39 pivoted upon a pin 40 on the main frame 1 and having bolts 41 and 42 which apply the desired amount of pressure to the shaft 5 and its attached parts to bring the same to rest when the shaft 5 is disconnected from the pulley 4. The clamping arms 39 may be provided with leather friction surfaces 43 if desired. The rear eccentric 37 is connected by means of a connecting rod 44 to a reciprocating head 45 and a wrist pin 46 passing through the connecting rod 44 to the head 45. In order to connect the eccentric 37 with the connecting rod 44 and to hold it in its position thereon, one side of the eccentric 37 has a flange 47 while the other side is provided with a cover plate 48 which may be secured thereto by screws. The forward eccentric 36 is also connected with the head 45 by means of a connecting rod 49 and a wrist pin 50. In order to hold the connecting rod 49 in place on the eccentric 36, said eccentric has upon its inner face a flange 51 and upon its outer face a clamping plate 52, the clamping plate being held in place by a screw 53. On the larger side of the eccentric 36 there are provided recesses to receive upon the forward and rearward faces of the eccentric cams 54 and 55, said cams being secured to the eccentric 36 by a bolt 56. These cams 54 and 55 coöperate respectively with rolls 57 and 58 located on a rod 59 carried in a slot 60 in the connecting rod 49. At every revolution of the eccentric 36 the cams 54 and 55 contact with rolls 57 and 58 thereby moving the same downwardly and moving in a downward direction a rod 61 which passes through the center of the connecting rod 49. This rod 61 contacts at its lower end with a rod 62 having a nut 63 and a washer 64 to hold in place a spring 65 normally moving the rod 62 upwardly owing to the fact that the lower end of the spring 65 is situated in a recess 66 against the upper end of a punch adjuster 67. At its lower end the rod 62 has a plunger 68, the purpose of which is, upon the downward movement of the rod 62, to discharge the blank from the blanking die. The punch adjuster 67 has a screw-thread 69 to coöperate with an adjusting nut 70 located on the adjuster 67, above a punch plate 71 secured to the head 45 by stud bolts 71ª, passing from the punch plate 71 through a portion of the head 45, said stud bolts 71ª having nuts 71ᵇ on their upper ends. A pair of dowel pins 71ᶜ locate the punch plate 71 in its proper position. An adjusting nut 72 is located below the punch plate 71. At its sides the punch adjuster 67 has a pair of flanges 73 with slots 74 to receive screws 75 to maintain the adjuster in its adjusted position. The screws 75 are screw-threaded to a clamping plate 76, which is secured to the under face of the punch plate 71. Upon the front of the punch plate 71 there is a bracket 77 which is held in place by screws 78 so as to hold the punch adjuster 67 and the punch which is attached to it removably in place on the punch plate 71. Upon the bottom of the punch adjuster 67 there is a pair of pins 78ª to fit within recesses 79 of a removable blanking punch 80 which punch 80 is secured to the lower end of the punch adjuster 67 by means of screws 78″ and 81. In this manner the punch 80 is arranged so that it may be readily removed and replaced. The head 45 at its side has a pair of V-shaped slides 82 which slide in a vertical direction in guides 83 carried on the main frame 1 by bolts 84. The guides 83 are arranged for lateral adjustment to take up wear by being supported against the ends of adjusting screws 85, passing through the main frame 1.

Upon the punch plate 71 there are five other punches, although the number of the punches may be of course varied to suit the operations which it is desired to carry out. After the blank has been cut out by the blanking punch 80, the blank is submitted to the action of the first folding punch 86 which is attached by means of screws 87 to a punch stem 88 having a screw-thread 89 on its upper end to permit adjustment. A pin 90 upon the lower end of the punch stem 88 also registers with holes in the first folding punch 86 to hold the punch 86 in the correct position. An adjusting nut 91 is carried by the screw-thread 89, said adjusting nut being contained within a recess 92 in a punch holder 93 secured to the under face of the punch plate 71 by screws 94. One side of the lower end of the punch holder 93 has a slot 95 and also has a pair of ears 96 with holes 97 to receive a clamping bolt 98 to hold the punch stem 88 in its adjusted position. The first folding punch 86 has a central opening 98$^a$ and the punch stem 88 has a recess 98$^b$ to receive a stripper plunger 98$^c$ carried on a rod 98$^d$ which passes upwardly through the folding punch stem 88 and has a nut 98$^e$ on its upper end. A spring 98$^f$ surrounds the rod 98$^d$ and is located in the recess 98$^b$ to normally force the plunger 98$^c$ downwardly and hold the blank in position while it is being operated upon. The purpose of the first folding punch is to turn upwardly the two side edges of the blank into a position at right angles to the body of the blank. After the blank has been submitted to the action of the first folding punch it is formed successively by a second folding punch 99 and a third folding punch 100. The second and third folding punches 99 and 100 are supported in the same manner as the first folding punch 88. These punches 99 and 100 are not, however, provided with stripper plungers but instead have nuts 100$^a$ for holding the punches in position in the place of the screws 87 used for holding the first folding punch 86 in place. The second folding punch has a pair of inclined surfaces 101 to fold over the edges of the blank into positions at an angle of 45° to the body of the blank, and the third folding punch 100 has similar inclined surfaces 102 which, however, are not located at so sharp an angle to the punch as in the case of the surfaces 101. The third folding punch bends over the edges of the blank to a position substantially parallel to the body of the blank. After the blank has been subjected to the third folding punch the blank is lettered and dated by means of a lettering punch 103 and a dating punch 104. The lettering punch 103 is supported in a recess 105 in a lettering punch stem 106 supported from the punch plate 71 in the same manner as the three folding punches. In the recess 105 there is a pin 107 which registers with a hole 108 in the lettering punch 105 so as to properly position the same. The dating punch 104 is supported in a rectangular recess 109 in the lettering punch stem 106 and secured in said recess by a screw 110. Beyond the lettering punch 103 there is a centering punch 111. The centering punch 111 is supported by a centering punch stem 112 and is secured thereto by a screw 113. The centering punch stem 112 is supported from the punch plate 71 in the same manner as the folding and lettering punches previously referred to. It will be noted that the centering punch 111 has a beveled edge 114 so as to properly center the same and thereby center all of the punches with regard to the stationary parts of the machine with which they coöperate. The centering punch 111 also has a recess 115 to register with a pin 116 located on the centering punch stem 112 to accurately position the same. At the two sides of the head 71 near its lower end a pair of brackets 117 are bolted to which are screw-threaded a pair of vertical rods 118 connecting the head 45 to a cross-beam 119 which in turn is connected by a link 120 to a bell-crank lever 121 journaled in the main frame 1. The bell-crank lever 121 has attached to its upper end an adjustable link 122 which link has its end positioned in a rocking sleeve 123 attached by a stud bolt 124 and a nut 125 to a pawl guide 126 which has an upwardly directed ear 127 through which the bolt 124 passes. The pawl guide 126 is arranged to receive upon its upper surface a pawl 128 having a spring 129 which rests against a pin 130 located upon the top of the pawl guide 126. A screw 131 secures the pawl 128 and the pawl guide 126 to the top of a slide 132 which reciprocates in a dove-tail groove 133 in a pawl guide block 134 attached by a screw 135 to the main frame 1. A gib 136 is made adjustable by a series of screws 137 to take up the wear on the slide. The purpose of the pawl 128 is to move an annular carrier 138 having a ratchet 139 upon its outer edge. The annular carrier 138 is a plate having eight openings 139$^a$. The openings 139$^a$ have beveled edges 140 to permit the centering of the carrier 138 by the centering punch 111 at each operation upon the blanks. Between the several openings 139$^a$ in the carrier 138 and upon the under surface of said carrier there are provided guide-plates 140$^a$, the edges of which extend slightly beyond the edges of the openings 139ª, said plates being secured in place by screws 140ᵇ. The carrier 138 is adapted to rotate in a ratchet casing 141 which has a central projection 142 upon its under face to register with a corresponding recess in the face of the main frame 1, and a cover plate 143 is secured to the top of the ratchet casing 142 by screws 144, said cover plate 143 having a flange 145 which extends over the edge of the carrier 138. In the center a friction plate 146 is provided which has a flange 147 extending over the inner edge of the annular carrier 138 to hold the same tightly in place during its rotation, screws 148 being provided to press the friction plate 146 downwardly with the desired degree of pressure. Supported upon the cover plate 143 and the friction plate 146 there is a blanking die holder 149 which is secured to the ratchet casing 142 by screws 150. This die holder 149 in turn supports a blanking die 151 which is attached to the holder by screws 152, the blanking die 151 being positioned on the die holder 149 by pins 152ª extending from the die holder 149 into the die 151. In the under face of the carrier 138 there is an annular recess 153 which provides a space for a bearing plate 154 which has an opening 155 at one side to permit the discharge of the completed and formed slides. Said bearing plate 154 also has a bottom lettering die 156 having a position opposite to the top lettering die 103 and also has a series of aluminum plugs 157 opposite the dating die 104. Opposite to the opening 155 there is also provided in the ratchet casing 142 an opening 158 to permit the discharge of the completed slides through the ratchet casing 142.

In the operation of my invention the pulley 4 will be driven by the belt 3. When it is desired to put the press in operation the treadle 8 is depressed thereby releasing the lever 11 from engagement with the arm 21 and coupling the pulley 4 to the shaft 5. The head 45 now reciprocates. When sheet metal is now inserted between the blanking punch 80 and the blanking die 151 a blank is punched out. The blank thus punched out is pushed downwardly by the plunger 68 through the agency of the cams 54 and 55 which operate upon the rolls 57 and 58. The blank then falls downwardly into the carrier 138, the edges of the blank resting upon the edges of plates 140ª. When this operation has been completed the carrier 138 is moved by the pawl 128 to a position opposite the first folding punch 86. The blank is here operated upon by the first folding punch so as to move the edges of the blank into a position at right angles to the body of the blank. In this forming operation, the plunger 98ᶜ holds the blank against the edges of the plates 140ª upon which the blank is supported until the first folding operation is completed. At the same time that the folding of the edges of the blank takes place an additional blank is being cut out by the blanking punch 80. The pawl 128 now moves the carrier 138 thus moving the first blank opposite the second folding punch 99 while the edges of the blank will be folded farther into positions at an angle of 45° to the main body of the blank. During this operation an additional third blank will be cut out by the blanking punch 80 and the second blank cut out will be operated upon by the first folding punch 86 to move its edges into a position at right angles to the main body of the blank. The pawl 128 now moves the carrier 138 until the first blank is opposite the third folding punch 100. This punch 100 moves the edges of the blank into a position parallel to the main body of the blank. Simultaneously therewith the blanking punch 80 cuts out a fourth blank and the first folding punch 86 and second folding punch 99 operate upon the blanks located at these points to form the same in the manner already described. The pawl 128 again moves the carrier 138 until the first blank is opposite the lettering punch 103 whereupon the lettering punch gives the blank the proper letters to be applied thereto and at the same time the dating die 104 gives the blank the required date. At the same time a fifth blank will be cut out by the blanking punch 80 and the first, second and third folding punches 86, 99 and 100 will operate upon the blanks opposite them in the manner previously described. The pawl 128 now moves the first blank opposite the centering punch 111. When this takes place the formed blank will fall downwardly through the opening 155 in the bearing plate 154 and the opening 158 in the ratchet casing 142 and the blank will be discharged from the machine. At the same time the other dies will again operate in the same manner to perform functions already described. The operation of the press is thus carried on continuously, the formed, lettered and dated blanks being continuously produced by the press merely by feeding into the same the required quantity of sheet metal. At each reciprocation of the head 45 all of the projections are centered at the centering punch 111, the beveled edge of which insures the accurate registry of the various punches and the stationary portions of the machine with which they coöperate. When the power is thrown off the machine by releasing the treadle 8 the press is quickly brought to rest by means of the brake 38. Inasmuch as the blanking punch requires more frequent sharpening it is arranged to be readily detachable independent of the remainder of the punches. Whenever it is desired to apply the press to a different series of operations the various parts may be readily removed and replaced for this purpose. This is readily accomplished by removing from the press the ratchet casing 142 and all of the parts supported thereby and by inserting a similar ratchet casing with the necessary parts attached thereto. The various punches may also be removed in a similar manner by removing the punch plate 71 and the various parts supported thereon and by inserting instead a new punch plate with the required parts attached.

While I have described my invention in detail, I wish it to be understood that many changes may be made therein without departing from the spirit of my invention.

I claim—

1. A press, comprising a blanking punch and die for producing a blank of a given size, and a plunger for removing the blank unchanged from the die.

2. A press, comprising a blanking punch and die for producing a blank of a given size, and a plunger in the punch for removing the blank unchanged from the die.

3. A press, comprising a blanking punch and die, a plunger for removing the blank from the die, and a cam for operating the plunger.

4. A press, comprising a blanking punch and die, a plunger in the punch for removing the blank from the die, and a cam for operating the plunger.

5. A press, comprising a blanking punch and die, a rotary carrier plate having openings therein into which the die discharges, and another punch for operating on the blank while in the carrier.

6. A press, comprising a blanking punch and die, an annular rotary carrier plate having openings therein into which the die discharges, and another punch for operating on the blank while in the carrier.

7. A press, comprising a blanking punch and die, a rotary carrier plate having openings therein into which the die discharges, and a folding punch for operating on the blank while in the carrier.

8. A press, comprising a blanking punch and die, an annular rotary carrier plate having openings therein into which the die discharges, and a folding punch for operating on the blank while in the carrier.

9. A press, comprising a blanking punch and die, a rotary carrier plate having openings therein into which the die discharges, and a lettering punch for operating on the blank while in the carrier.

10. A press, comprising a blanking punch and die, an annular rotary carrier plate having openings therein into which the die discharges, and a lettering punch for operating on the blank while in the carrier.

11. A press, comprising a blanking punch and die, a rotary carrier plate having openings therein into which the die discharges, a folding punch and a lettering punch, both arranged for operating on the blank while in the carrier.

12. A press, comprising a blanking punch and die, an annular rotary carrier plate having openings therein into which the die discharges, a folding punch and a lettering punch, both arranged for operating on the blank while in the carrier.

13. A press, comprising a blanking punch and die, a rotary carrier into which the die discharges, another punch for operating on the blank while in the carrier, and a centering punch for positioning the carrier with regard to the punches.

14. A press, comprising a blanking punch and die, an annular rotary carrier into which the die discharges, another punch for operating on the blank while in the carrier, and a centering punch for positioning the carrier with regard to the punches.

15. A press, comprising a blanking punch and die, a rotary carrier into which the die discharges, a folding punch, a lettering punch, both arranged for operating on the blank while in the carrier, and a centering punch for positioning the carrier with regard to the punches.

16. A press, comprising a blanking punch and die, an annular rotary carrier into which the die discharges, a folding punch, a lettering punch, both arranged for operating on the blank while in the carrier, and a centering punch for positioning the carrier with regard to the punches.

17. A press, comprising a blanking punch and die, a folding punch, a lettering punch, a centering punch to center the other punches, and means for operating the same in serial order.

18. A press, comprising a blanking punch and die, a folding punch, a lettering punch, a centering punch to center the other punches, and means for operating the same in serial order upon the same blank.

19. A press, comprising a blanking punch and die, a carrier into which the die discharges, the carrier being bridged over by the blanking die, and another punch for operating on the blank while in the carrier.

20. A press, comprising a blanking punch and die, an annular carrier into which the die discharges, the carrier being bridged over by the blanking die, and another punch for operating on the blank while in the carrier.

21. A press, comprising a blanking punch and die, a carrier into which the die discharges, the carrier being bridged over by the blanking die, another punch for operating on the blank while in the carrier, and a centering punch for positioning the carrier with regard to the punches.

22. A press, comprising a blanking punch and die, an annular carrier into which the die discharges, the carrier being bridged over by the blanking die, another punch for operating on the blank while in the carrier, and a centering punch for positioning the carrier with regard to the punches.

In testimony that I claim the foregoing I have hereunto set my hand.

FLOYD D. STOWE.

Witnesses:
C. K. MUDGE,
A. M. GORMAN.

Copies of this patent may be obtained for five cents each, by addressing the "Commissioner of Patents, Washington, D. C."